(12) United States Patent  
Enzinna

(10) Patent No.: US 6,211,630 B1
(45) Date of Patent: Apr. 3, 2001

(54) SINGLE MOTOR, TWO FILM BELT CONTROL SYSTEM

(75) Inventor: Donald John Enzinna, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/501,067

(22) Filed: Feb. 9, 2000

(51) Int. Cl.$^7$ ........................................ H02K 7/14
(52) U.S. Cl. ........................ 318/3; 89/33.02; 89/33.14
(58) Field of Search ............................ 318/3; 89/33.02, 89/33.14

(56) References Cited

U.S. PATENT DOCUMENTS 5,905,224 * 5/1999 Jordan ........................................ 318/3
6,119,313 * 9/2000 Gohler ........................................ 318/3

* cited by examiner

Primary Examiner—Karen Masih
(74) Attorney, Agent, or Firm—Patrick M. Griffin

(57) ABSTRACT

An automotive HVAC system controls two side by side film belts with a single drive motor. Two co planar wind up rollers, one for each belt, have inboard ends that are indirectly connected by a rotation transmission means that has a defined level of turning "slack". Rotation is transmitted from one wind up roller to the other only after the slack has been taken up, allowing a certain degree of offset between the two belts. When a first belt is turned past a first position, it eventually moves the other belt to a new position, with the defined belt offset maintained. The first belt can then be turned back, breaking the indirect connection between the two shafts.

4 Claims, 5 Drawing Sheets

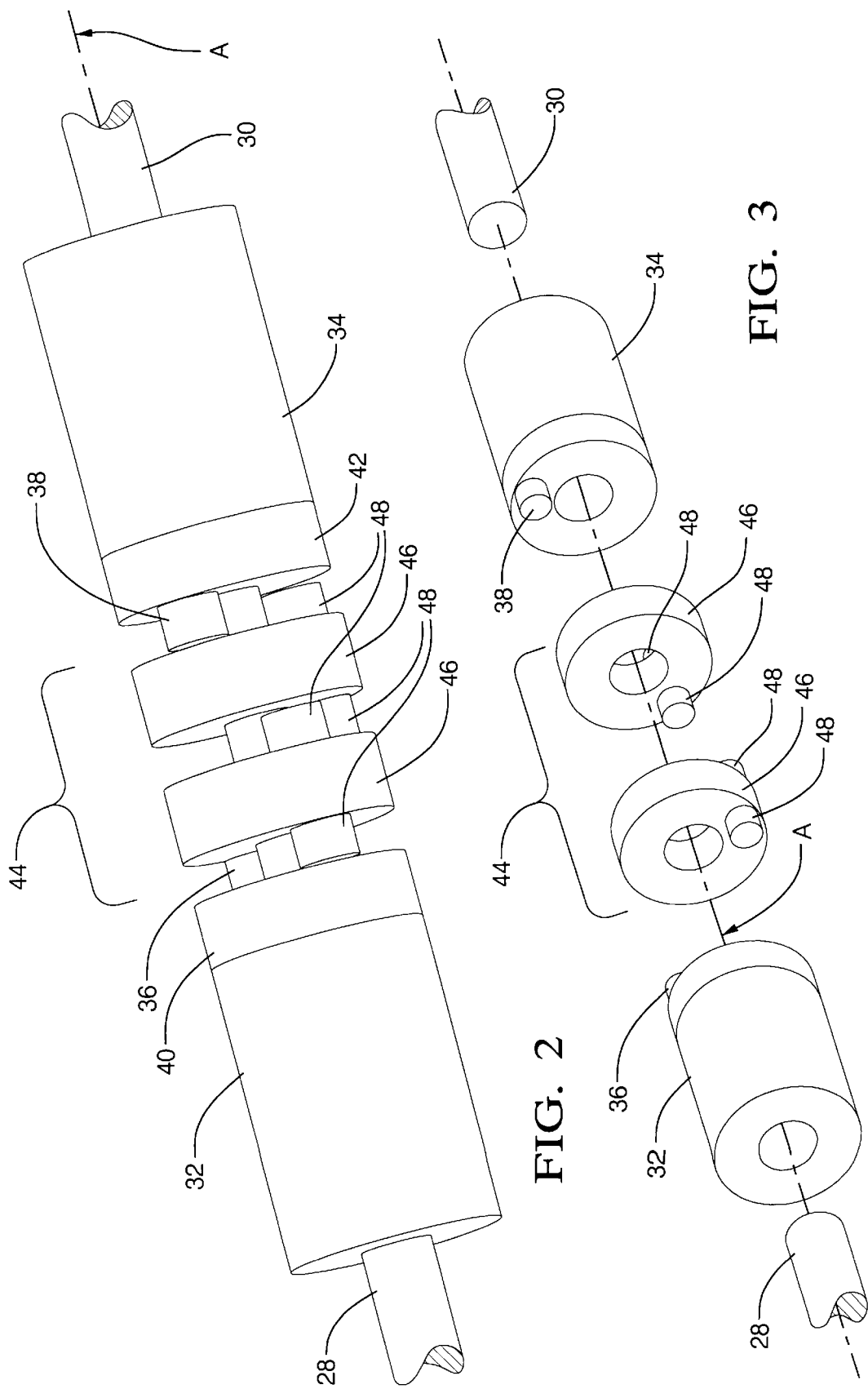

SINGLE MOTOR, TWO FILM BELT CONTROL SYSTEM

TECHNICAL FIELD

This invention relates to air conditioning and ventilation systems in general, and specifically to a system that can drive two separate film belts to substantially differing locations with a single drive motor.

BACKGROUND OF THE INVENTION

Flexible, rolling film belts are finding increasing acceptance as an alternative to bulkier, and non linear, swinging doors. A typical system uses a belt with one or more apertures that rolls back and forth from a powered wind up roller onto a passive, take up roller. Any fraction of the belt aperture can be aligned with a duct or frame opening to achieve a corresponding degree of air flow. A flat belt is also inherently more compact than a swinging door.

Newer automotive HVAC systems often provide for multi zone (individual occupant) air flow rate or temperature control, or both. To achieve independent control with a film belt system, separate film belts capable of at least substantially independent movement are required. Typically, this would also require a separate drive motor to turn the wind up roller of each belt. The motor is one of the more expensive and space consuming elements of the system.

SUMMARY OF THE INVENTION

The subject invention provides a means for driving two separate film belts with a single motor. In the preferred embodiment disclosed, first and second apertured belts are arranged side by side and substantially co planar, with first and second wind up rollers arranged on a common central axis. The two wind up rollers run on separate shafts, with axially spaced inboard ends. Each wind up roller inboard end has an axially extending, narrow drive lug thereon, which rotates about the central axis, but there is no direct overlap between the drive lugs, and no direct interconnection between the wind up rollers' in board ends. Instead, in the axial space between them, a rotation transmission mechanism comprised of one or more annular members rotates freely on a shaft coaxial to the central axis. Each annular member has a pair of oppositely axially extending contact lugs, the outboard ones of which are engageable with the wind up roller drive lugs, and the inboard ones of which are mutually engageable. A single motor directly drives only the first wind up roller, in response to a conventional controller that can sense either actual belt position or roller position.

The presence of the one or more freely rotating members between the two wind up rollers allows for driving engagement between the two when, but only when, the first wind up roller has been turned far enough in either given direction to remove all of the "slack" from the system. That is, when all of the various drive and contact lugs are mutually engaged. Assuming that the separate belts start out with their apertures in an aligned position, but with some slack in the system, the single motor turns only the first windup roller until the point that all of the various lugs make contact with one another. During this initial movement, the first belt moves, but the second belt does not, so the two belt apertures move into an "offset" relative position. Once contact is made, the second wind up roller begins to move as well, and both belts move in the same direction, while maintaining the offset. When the second belt has been moved to a desired position, the motor and first wind up roller can be moved back in the opposite direction, moving the first belt aperture back, but without moving the second belt, until the point where all of the lugs mutually contact again in the opposite direction. At that point, further movement of the first wind up roller would again move both belts, but with a reversed relative offset between the two belts. The amount of total relative belt offset available would be set by varying the total number of annular members, and thereby varying the total number of roller turns possible while the system is "slack".

BRIEF DESCRIPTION OF THE DRAWINGS

These and other features of the invention will appear from the following written description, and from the drawings, in which:

FIG. 2 is a perspective view of the inboard ends of the two wind up rollers and the rotation transmission means;

FIG. 3 is an exploded version of FIG. 2;

DESCRIPTION OF THE PREFERRED EMBODIMENT

Figure 1:
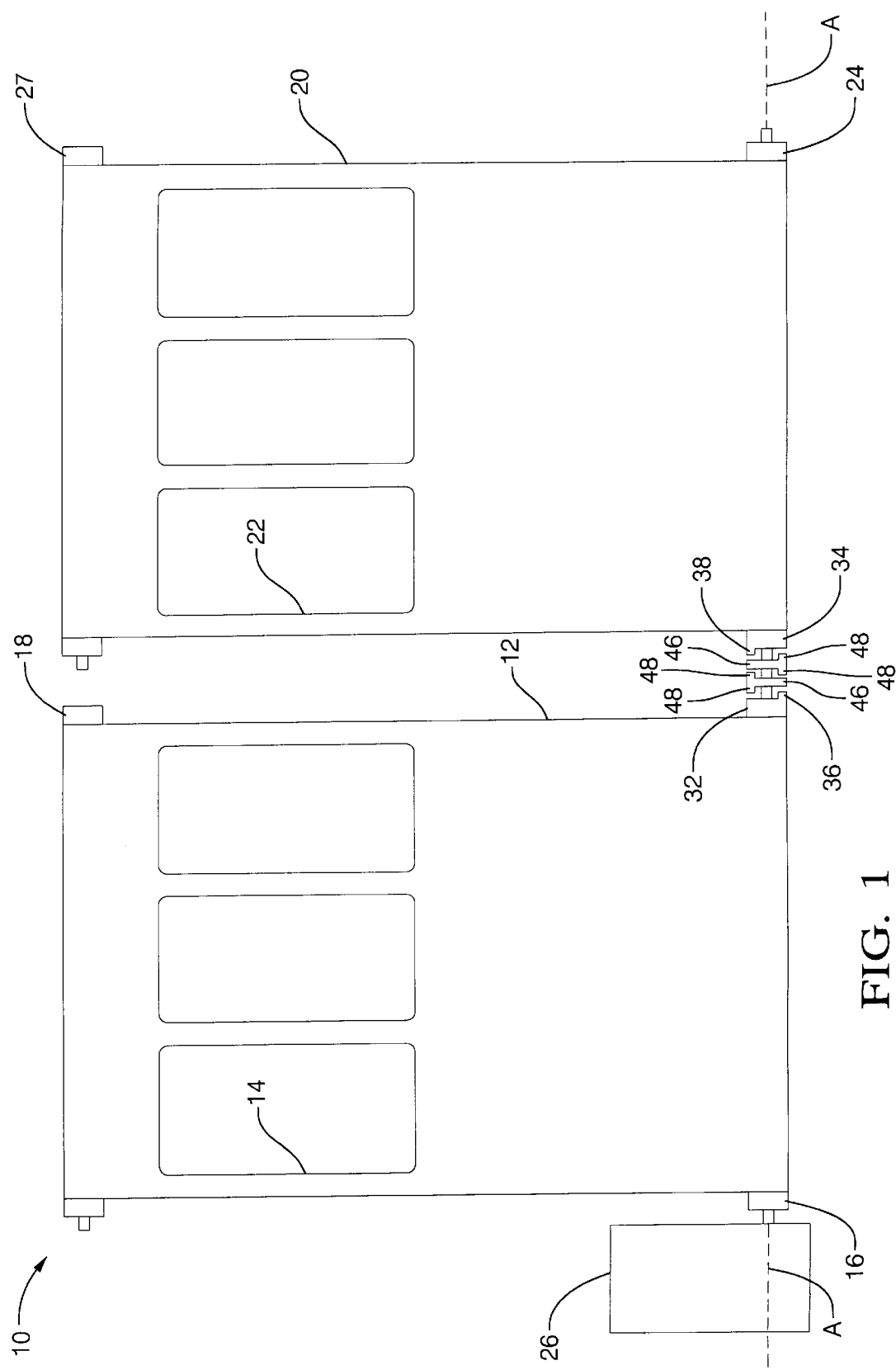
FIG. 1 is a plan view of two separate film belts in a system according to the invention.

Referring first to FIG. 1, a preferred embodiment of the invention is indicated generally at 10. The invention is intended for use in a multi zone automotive HVAC system, most of which is not illustrated, but will be familiar to those skilled in the art. The subject invention could, for example, be used to control air flow through a heater core, and thereby substantially independently vary the temperature between two or more occupant zones (two as disclosed). A controller would be available that could sense and respond to either belt position, or the number and direction of roller turns, or both. The presence and availability of these standard features should be understood, but they do not directly comprise an element of the subject invention. A first flexible film belt 12 with a set of apertures 14 rolls back and forth between a first wind tip roller 16 and a first take up roller 18. "Wind up" roller, as opposed to "take up" roller, indicates an active, powered condition, although either roller may be winding out, or taking up, the belt material, depending upon the direction of belt movement. Adjacent to, and coplanar with, first belt 12 is a separate flexible film belt 20, which winds back and forth between a second wind up roller 24 and a second take up roller 27. The wind up rollers 16 and 24 are co axial, on a central axis A, but there is no direct connection between them. The first wind up roller 16 is directly powered by a single power means, such as by an electric motor 26, but the second wind up roller 24 is only indirectly powered, as described below.

Referring next to FIGS. 2 and 3, additional detail of the indirect connection between the two wind up rollers 16 and 24 is illustrated. Each wind up roller 16 and 24 turns on a separate center shaft 28 and 30 respectively, which lie on central axis A. Each wind up roller also has an inboard end 32 and 34 respectively which rotates one to one there with. Conveniently, each inboard end 32 and 34 may be a separate end piece, as shown, fixed to rotate one to one with the respective wind up roller 16 and 24. Each inboard end 32 and 34 has an integral drive lug 36 extending parallel to central axis A, in opposite directions, and with the same radial spacing from axis A, but with no overlap or contact with each other. Each drive lug 36 and 38 is circumferentially discrete, that is, it is relatively narrow, and only as wide as necessary for strength considerations. Each inboard roller end 32 and 34 would be radially supported by some means that did not block the axial space therebetween, as by a plane bearing (not illustrated) contacting the annular surface areas indicated generally at 40 and 42. No particular type of bearing support is required, beyond one that leaves the axial space between the two inboard ends 32 and 34 unobstructed, for reasons described next.

Still referring to FIGS. 2 and 3, an indirect connection between the two wind up rollers 16 and 24 is established by a rotation transmission means, indicated generally at 44. This comprises, in the embodiment disclosed, at least one (two here) annular bodies 46, which freely rotate around central axis A. Conveniently, these can rotate on the end of one of the wind up roller shafts 28 or 30, since these lie on axis A. Each annular body 46 has a pair of oppositely axially extending contact lugs 48 that are co radial to the drive lugs 36 and 38, and substantially as narrow. Axial confinement of the two annular bodies 46 between the two inboard ends 32 and 34 serves to maintain all of the drive lugs 36, 38 and the contact lugs 48 in a condition of continual radial overlap, but with enough axial play to prevent rubbing. The outboard contact lugs 48 are capable of engaging the drive lugs 36 and 38, while the inboard contact lugs 48 would contact only one another. The operation of rotation transmission means 44 is described next.

Figure 4:
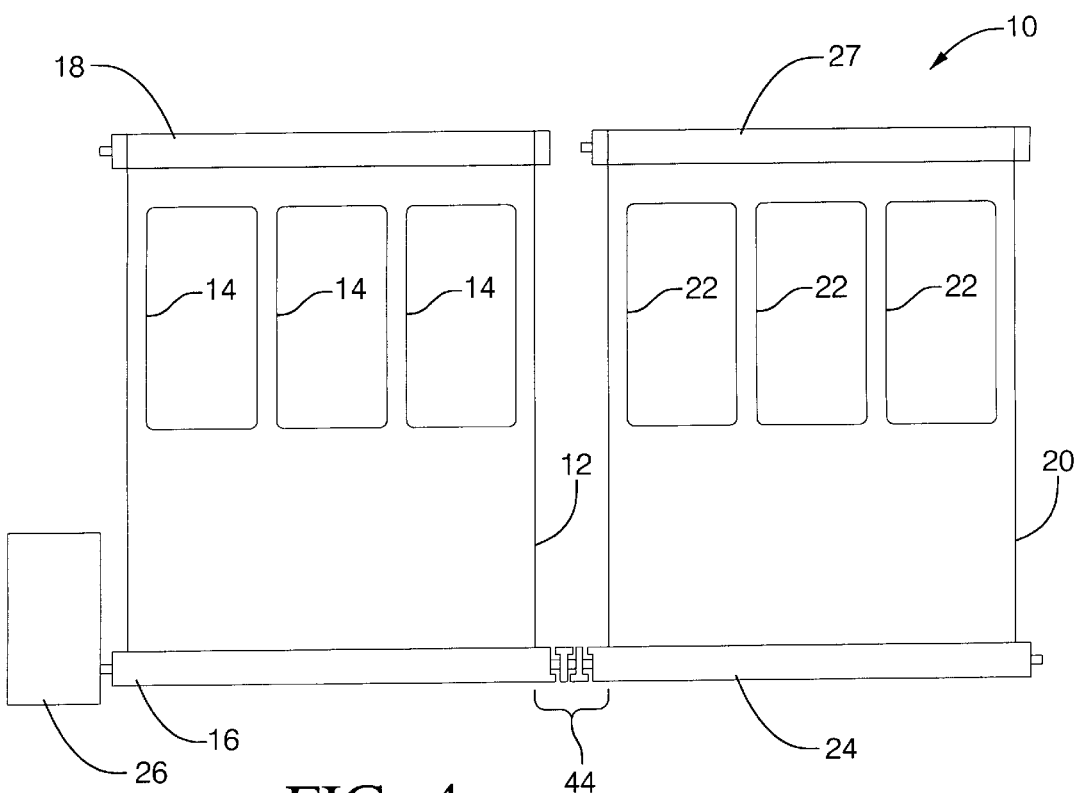
FIG. 4 is a view similar to FIG. 1, showing a starting point of the two belts prior to attaining a moved position, while there is still slack in the system.

Referring next to FIG. 4, an arbitrary initial position is illustrated. In the FIG. 4 position, the two belts 12 and 20 are located with their apertures 14 and 22 aligned, that is, with no radial offset. In that relative location, the belts 12 and 20 would have the same net effect within any HVAC system, that is, they would pass the same flow of air. To provide multi zone discrimination, they have to be capable of being moved at least substantially independently of one another, to a relatively offset position, which the invention allows. In the FIG. 34 position, there is "slack" in the rotation transmission means 44, that is, not all of the various lugs 36, 38 and 48 are in contact, and therefore not capable of transmitting rotation. A certain degree of relative turns, in either direction, between the inboard ends 32 and 34 (between the rollers 16 and 24) will be necessary to bring them all into mutual contact. Remembering that turning first roller 16 in either direction is the equivalent of moving first belt 12 up or down, the system could be set up with the slack "symmetrically split" in the FIG. 4 position, that is, arranged so that moving first belt 12 up or down by an equal offset relative to the second belt 20 would cause all of the lugs 36, 38 and 48 to contact in either direction. Or it could be set up so that all of the slack was already out of the system, and moving first belt 12 at all, in one direction of the other, would begin to move the second belt 20. The slack could also be asymmetrically split, so that more relative motion in one direction or the other would be needed to remove the slack. A potential means for setting that "split" is described further below.

Figure 5:
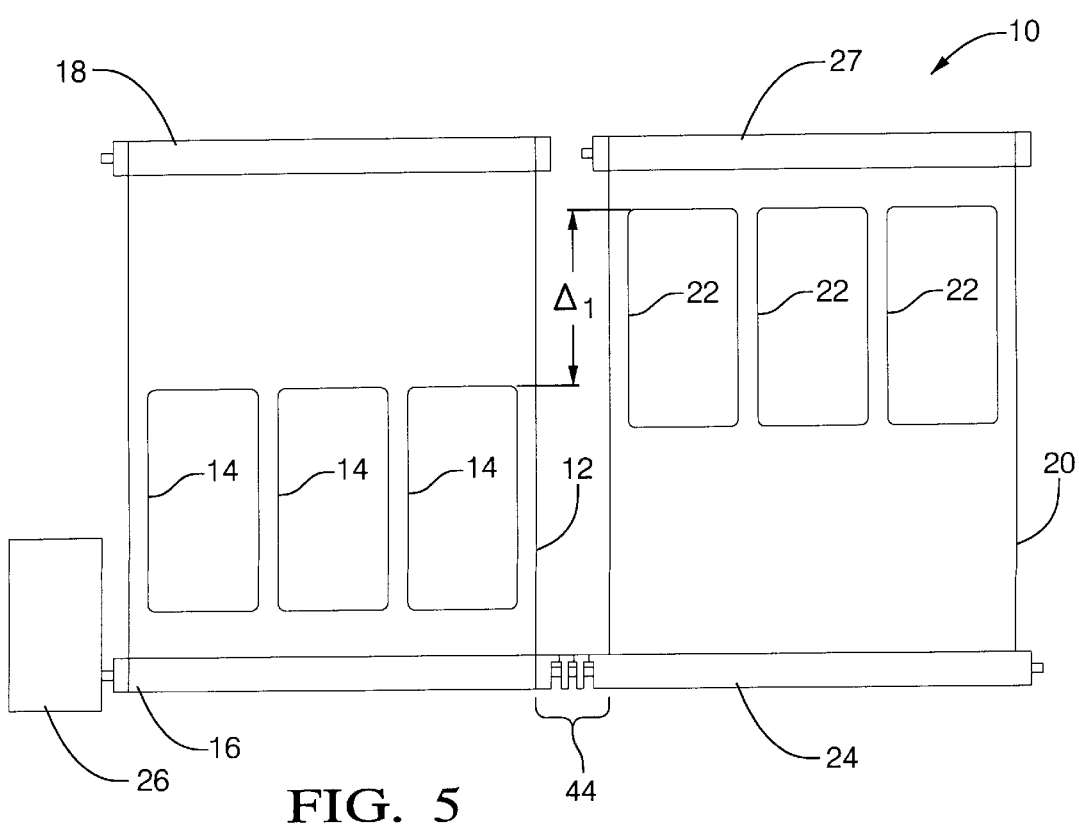
FIG. 5 shows the relative belt position at the point where slack has been taken out of the system.

Referring next to FIG. 5, the first belt 12 has been moved downward relative to second belt 20, by directly turning first wind up roller 16 with motor 26. Just as a relative offset of $\Delta1$ is reached between the two belts 12 and 20, the rotation transmission means 44 becomes active, that is, all of the radially and axially overlapping lugs 36, 38 and 48 make mutual contact. Rotation is now transmitted to second wind up roller 24. Second belt 20 now begins to move downward at the same rate, maintaining the same relative offset.

Figure 6:
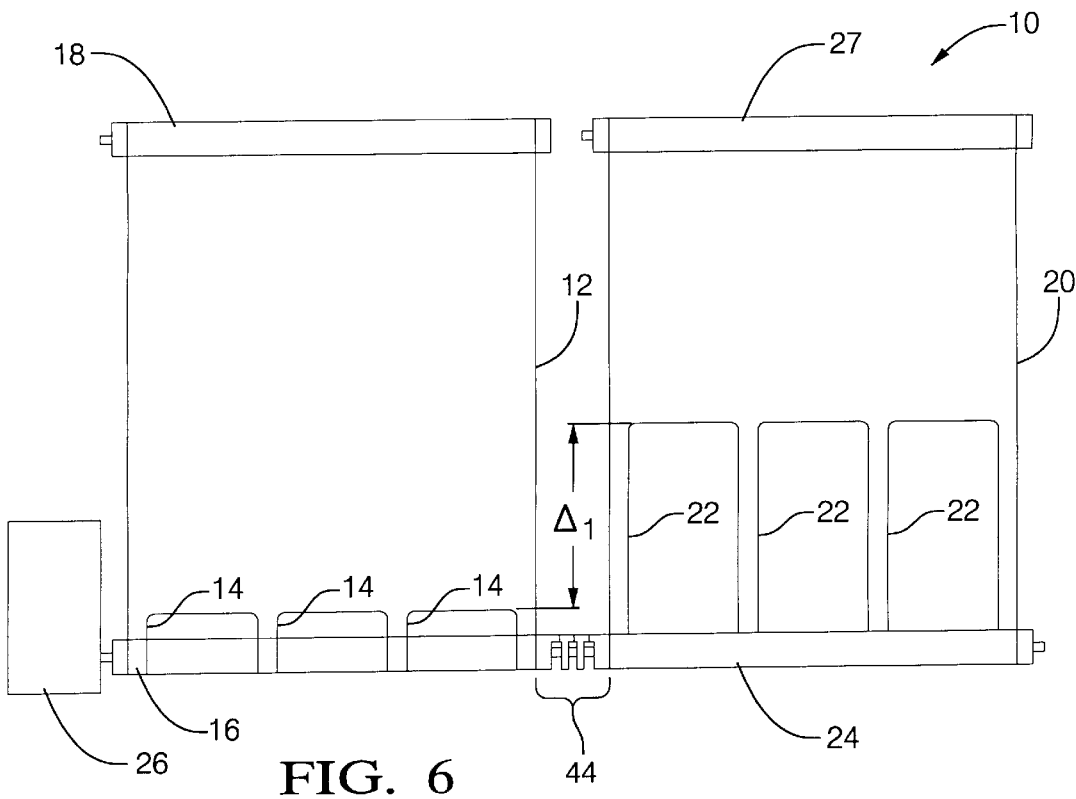
FIG. 6 shows the relative belt position just as the desired new position of the second belt has been attained.

Referring next to FIG. 6, the first belt 12 has been rolled down farther, taking second belt 20 to a location shifted significantly down from its original location. The same $\Delta1$ relative offset has been maintained, and the rotation transmission means 44 has remained active and maintained the turning connection between the two wind up rollers 16 and 24. First belt 12 has been shifted down far enough that its apertures 14 might be out of position. However, the absolute and relative position of the two sets of apertures 14 and 22 might be correct under certain circumstances, as well, depending on what relative air flow rates were described. In any event, the relative position of the two belts 12 and 20 would be sensed by a conventional sensing and control system, and further belt motion, if any, would be initiated by the control system's operation of drive motor 26.

Figure 7:
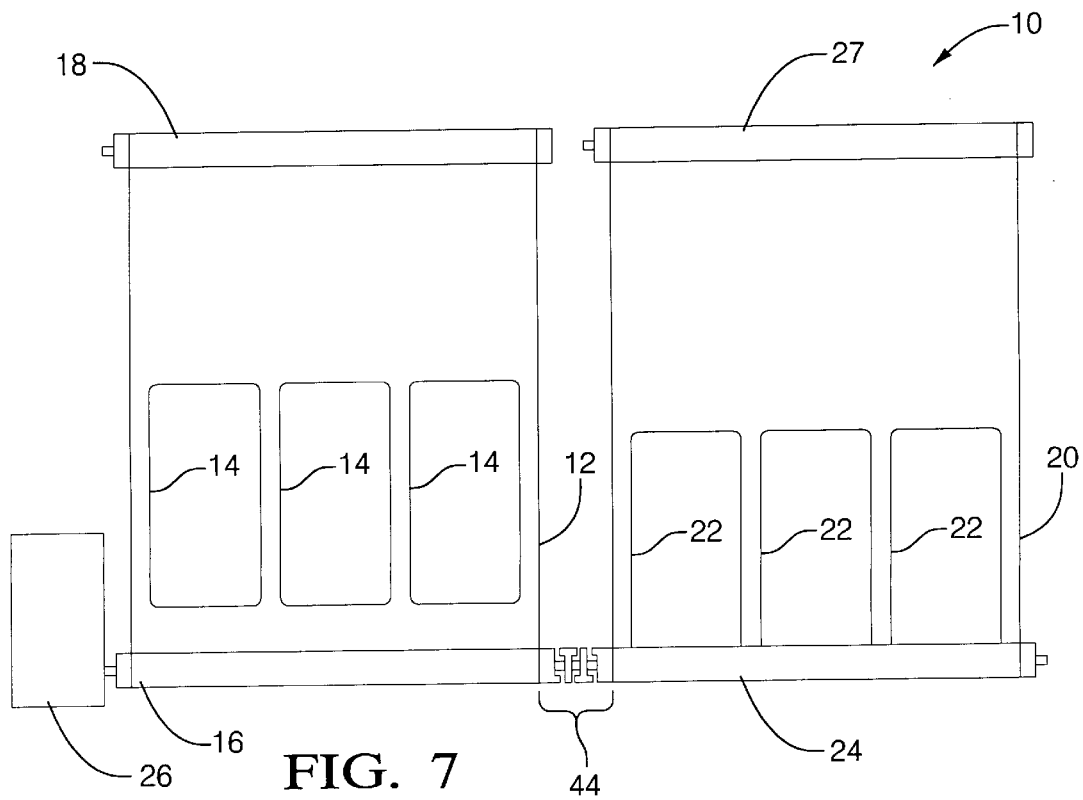
FIG. 7 shows the first belt being shifted back in the opposite direction to break the indirect connection.

Referring next to FIG. 7, it will be assumed for further illustration that in fact first belt 12 was "over turned" in the previous FIG. 6 position, and that it is desired to shift it back up, to at least some extent. The first belt 12 can be reversed and moved up, by turning first wind up roller 16 in the opposite direction (with the single motor 26), which will immediately cause the rotation transmission means 44 to again go "slack," that is, to break the mutual contact between the lugs 36, 38 and 48. First belt 12 will then roll up freely, without affecting second belt 20, at least until the driving connection is re formed in the opposite direction. In FIG. 7, there is still slack in the system, and first belt 12 is still moving back up freely. It should be understood that some kind of tensioning and counterbalancing system would be incorporated in and between the second wind up roller 24 and second take up roller 27 to passively maintain second belt 20 in whatever position it is left in.

Figure 8:
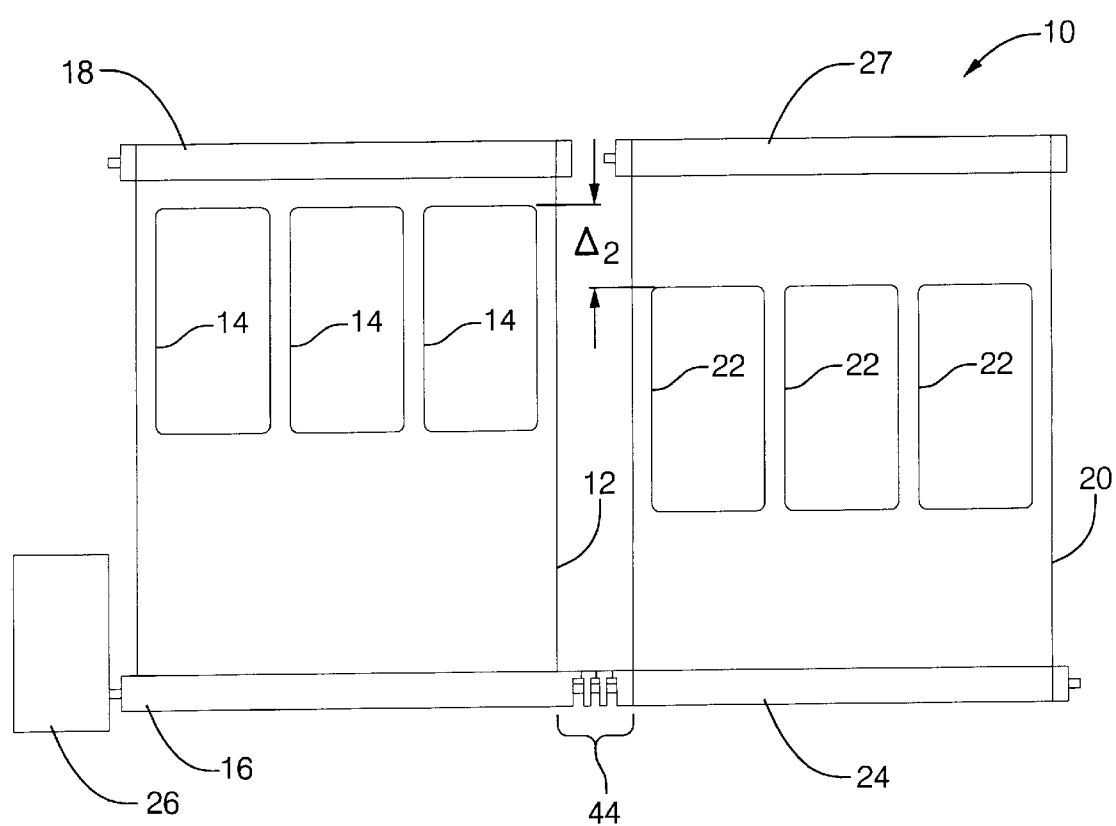
FIG. 8 shows the first belt having been moved far enough to again remove the slack from the system and shift the second belt in the opposite direction.

Referring next to FIG. 8, first belt 12 has shifted back up relative to second belt 20 far enough to reactivate the rotation transmission means 44. First belt 12 has moved back slightly past its FIG. 4 starting position, pulling second belt 20 back up, but not as far as its FIG. 4 starting position. The relative belt offset in the upward direction is $\Delta2$, less than $\Delta1$, so the slack in the system is asymmetrically split, as described above. That split could be divided up in any desired fashion by providing a "setting" mechanism for the wind up roller inboard ends 32 and 34, so that they and the drive lugs 36 and 38 could be turned and set to any relative starting position when the belts 12 and 20 were aligned.

Referring to FIGS. 4, 6 and 8, it can be seen that there was not enough potential relative belt offset ($\Delta2$) in the reverse direction to allow first belt 12 to be returned from its FIG. 6 "overturned" position to its FIG. 4 starting position, and yet still leave second belt 20 in its FIG. 6 shifted position. More slack in the rotation transmission means 44 in the return direction, more "$\Delta2$", would be required in order to do that. That could be arranged by dividing up the "slack" in the system to be biased more toward $\Delta2$, as described above, or by providing more total potential relative belt offset ($\Delta1$ plus $\Delta2$) or some combination of the two. More total potential relative belt offset could be provided by increasing the number of annular bodies 46, thereby creating more contact lugs 48 that would have to make contact, and providing for more "slack turns". A designer would, in the first instance, decide what the total potential relative belt offset was needed in any given case. Knowing the belt offset length (Δ1 plus Δ2) and the radius of the wind up rollers 16 and 24, one could calculate the number of relative slack turns necessary to provide that needed offset. This could be any integer number of relative turns, although probably three or fewer would be most practical.

Variations in the disclosed embodiment could be made. The single power means could conceivably be a mechanism other than a motor 26, although that is most common. While it is important that the wind up rollers 16 and 24 be coaxial, the take up rollers 18 and 27 need not, although they typically would be. As already noted, more or fewer annular bodies 46 could be incorporated. The various lugs 36, 38 and 48 could have any shape that allowed them to make good contact without occupying excessive circumferential space. A wedge or "pie" shape, for example, could work well. The drive lugs 36 and 38 could be carried by any part of the wind up rollers 16 and 24, but the separate ends 32 and 34 are convenient and provide the extra potential of being able to easily "set" the relative starting position of the drive lugs 36 and 38.

What is claimed is:

1. For use in a film valve air flow control system, a drive means for operating two separate film belts with a single power means, comprising, a first film belt that can be wound back and forth between a first wind up roller having a central axis and a first take up roller, said first wind up roller having an inboard end with a circumferentially discrete drive lug thereon that rotates around said central axis, a second, separate film belt that can be wound back and forth between a second, separate wind up roller and a second take up roller, said second wind up roller being coaxial to said central axis and having an inboard end axially spaced from said first wind up roller inboard end, said second wind up roller inboard end also having a circumferentially discrete drive lug thereon that rotates around said central axis, an actuator that directly turns said first wind up roller back and forth, and, a rotation transmission means located in the axial space between said first and second wind up rollers' inboard ends, said rotation transmission means comprising at least one freely rotating body centered on said central axis with a first circumferentially discrete contact lug engageable with the drive lug on the first wind up roller and a second circumferentially discrete contact lug on engageable with the driven lug on said second wind up roller so as to create an indirect turning connection between said wind up rollers only when all of said contact lugs and drive lugs are engaged, and, a single power means for directly turning said first wind up roller, whereby said second belt and second wind up roller can be indirectly operated with said single power means by turning said first wind tip roller in a given direction far enough to engage all drive lugs and contact lugs to turn said second wind up roller far enough to move said second film belt to a desired location, after which said first wind up roller can be turned back in the opposite direction to disengage said drive lugs and contact lugs to break the indirect connection.

2. A drive means according to claim 1, further characterized in that the rotation transmission means includes one or more annular bodies freely rotatable on the central axis, with contact lugs on either side of said rotatable bodies.

3. A drive means according to claim 1, further characterized in that the power means is an electric motor.

4. A drive means according to claim 1, further characterized in that the first and second belts are substantially coplanar.

* * * * *